(12) United States Patent
Keaton et al.

(10) Patent No.: US 6,772,997 B2
(45) Date of Patent: Aug. 10, 2004

(54) SELF-PROPELLED CRAWLER FOR LIFTING, SERVICING, AND MOVING AUTOMOBILES

(75) Inventors: James E. Keaton, 14685 Blunts Bridge Rd., Doswell, VA (US) 23047-2161; James L. Kunka, Powatan County, VA (US); Donald R. Haulsee, Surry County, VA (US)

(73) Assignee: James E. Keaton, Doswell, VA (US)

(*) Notice: Subject to any disclaimer, the term of this patent is extended or adjusted under 35 U.S.C. 154(b) by 0 days.

(21) Appl. No.: 10/636,943

(22) Filed: Aug. 7, 2003

(65) Prior Publication Data

US 2004/0061100 A1 Apr. 1, 2004

Related U.S. Application Data

(60) Division of application No. 09/727,258, filed on Nov. 30, 2000, now Pat. No. 6,612,152, which is a continuation-in-part of application No. 09/563,445, filed on May 1, 2000, now Pat. No. 6,564,621
(60) Provisional application No. 60/132,139, filed on May 1, 1999.

(51) Int. Cl.$^7$ ................................................. B66F 7/12
(52) U.S. Cl. .......................................................... 254/90
(58) Field of Search ........................... 254/90, 88, 2 R, 254/2 B, 8 R, 8 B; 414/495, 563, 678, 10, 508, 538; 180/9.26, 8.72

(56) References Cited

U.S. PATENT DOCUMENTS

| | | | |
|---|---|---|---|
| 3,931,895 A | | 1/1976 | Grimaldo |
| 4,106,634 A | * | 8/1978 | Becker .................... 414/495 |
| 4,445,665 A | | 5/1984 | Cray |
| 4,750,856 A | | 6/1988 | Lapiolahti |
| 5,054,207 A | | 10/1991 | Marshall |
| 5,111,685 A | | 5/1992 | Langer |
| 5,148,703 A | | 9/1992 | Vaughan et al. |
| 5,173,856 A | | 12/1992 | Purnell et al. |
| 5,232,064 A | | 8/1993 | Kroll et al. |
| 5,375,464 A | | 12/1994 | Dadt |
| 5,452,607 A | | 9/1995 | Axtell |
| 5,569,836 A | | 10/1996 | Hill |
| 5,574,226 A | | 11/1996 | Reuther et al. |
| 5,810,544 A | | 9/1998 | Wellman |
| 6,044,696 A | | 4/2000 | Spencer-Smith |

* cited by examiner

Primary Examiner—Robert C. Watson
(74) Attorney, Agent, or Firm—Robert C. Lyne, Jr.

(57) ABSTRACT

A system for servicing a racing car or other car at a track, other race course, or similar destination employs an open platform for supporting the car by its tires in a horizontal position. The platform supports the car, and is itself supported by a crawler, in a carrier vehicle, for example a truck or trailer, when the carrier vehicle is transporting the car. The crawler and platform are also used to unload and load the car from and into the carrier vehicle. To unload the car at the destination, the crawler, with the platform and car on it, is driven out of the carrier vehicle and onto the ground. Next, the platform is elevated by extending its legs so that it rises off, is spaced from, and straddles the crawler. Then the crawler is driven out from under the platform. Then the platform is lowered to the ground., where it is used as a lift to elevate the car so that its undercarriage may be accessed. The platform may also be used to tune the chassis of the car. The chassis tuning may include manipulating the chassis to a static position which emulates an instantaneous position of the car on the race course. The carrier, platform, and car may be loaded back into the carrier vehicle by the reverse procedure.

4 Claims, 18 Drawing Sheets

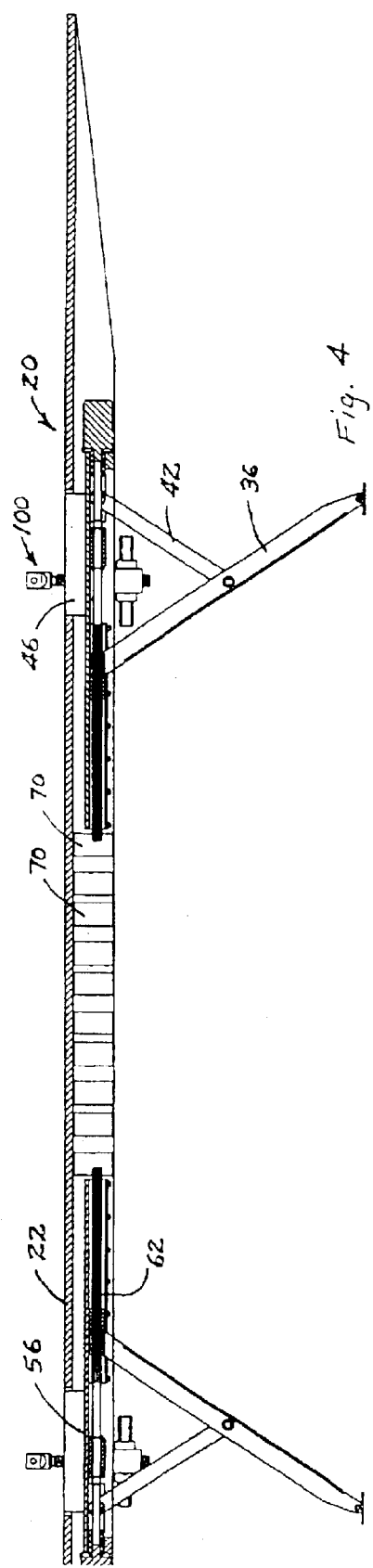

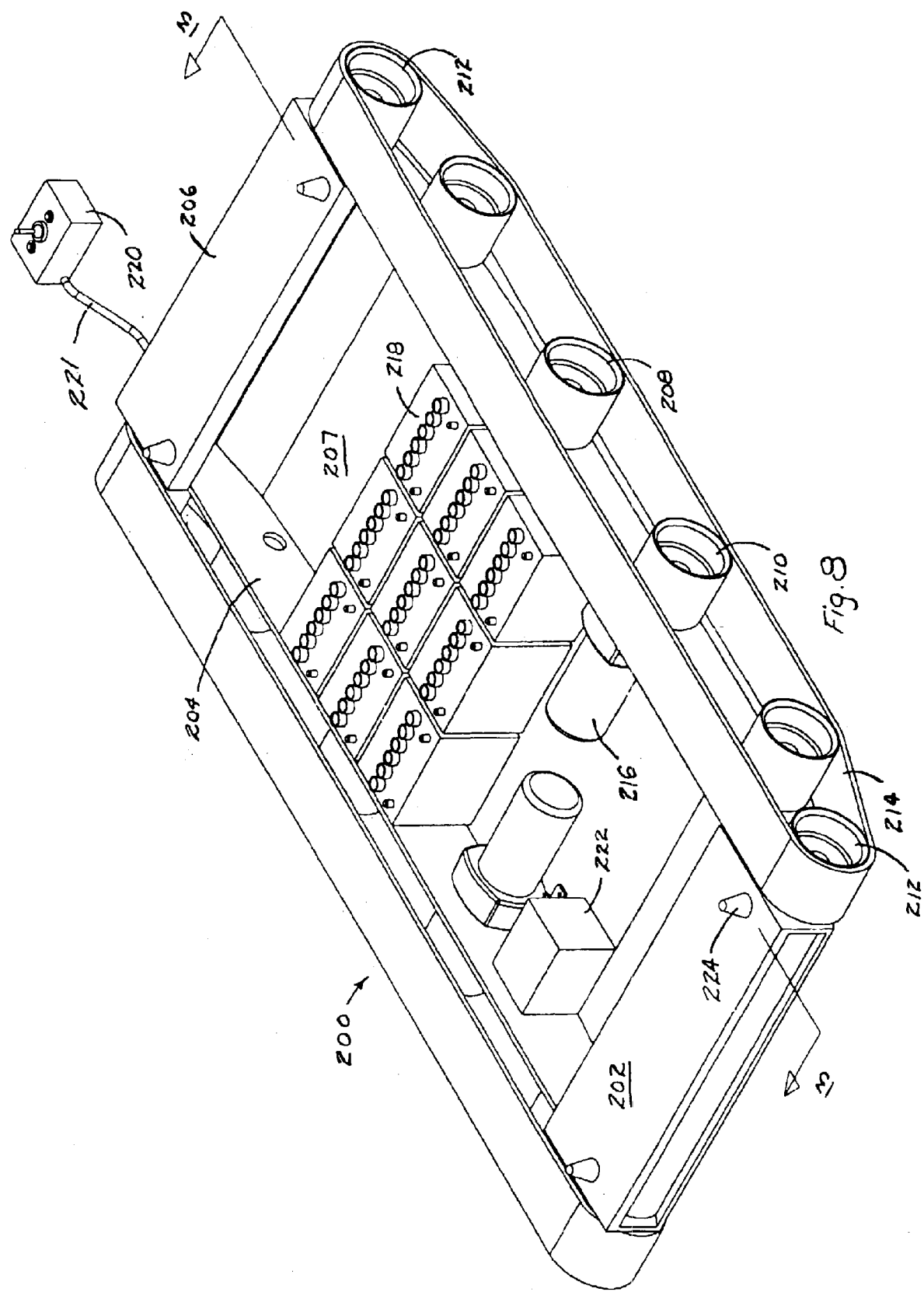

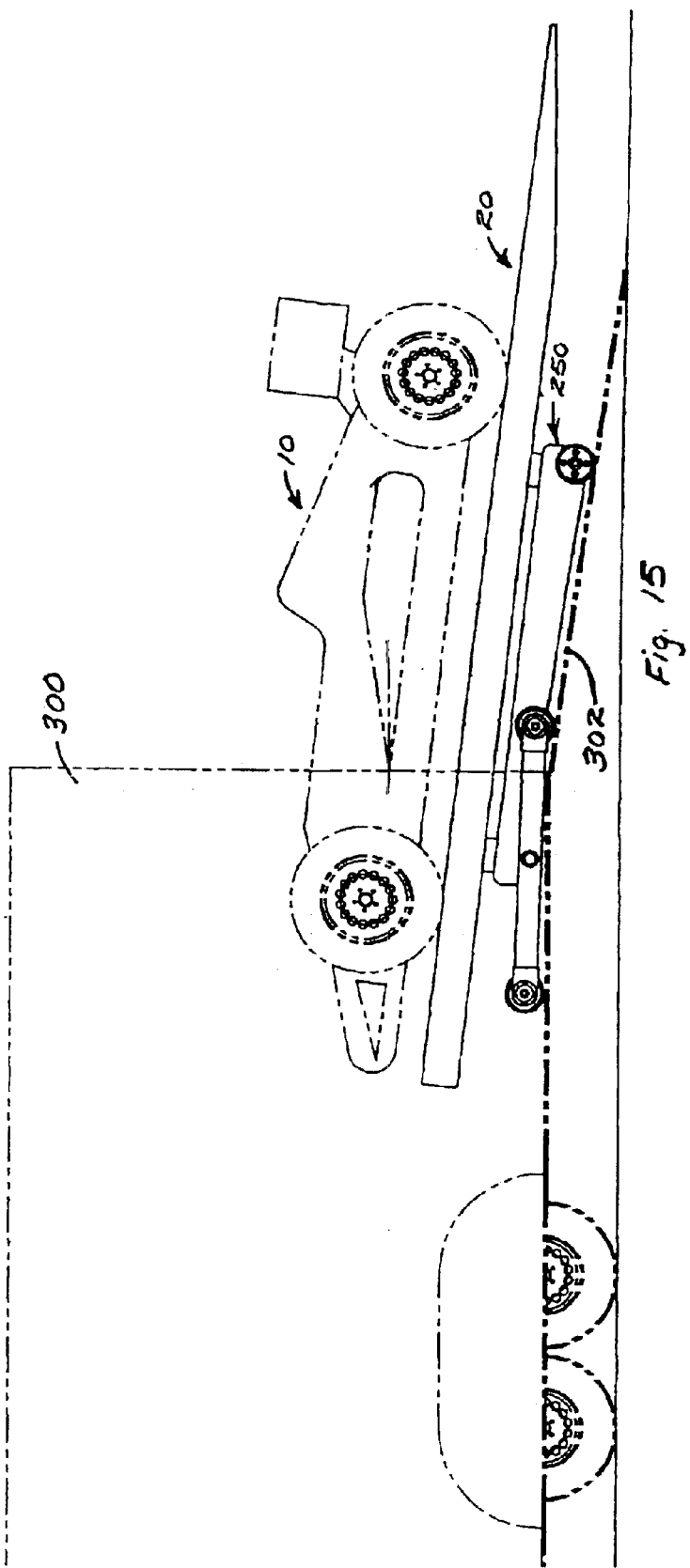

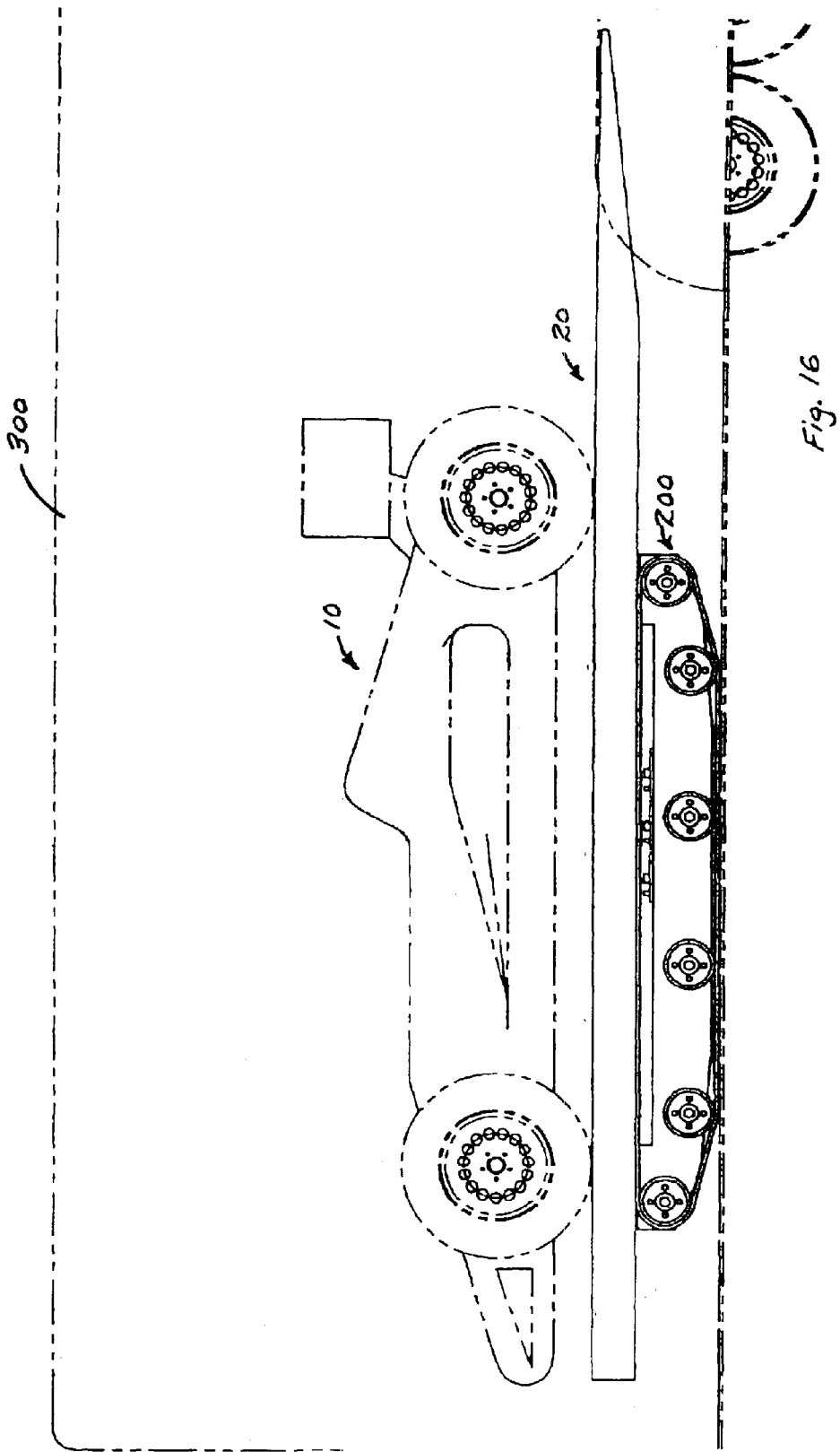

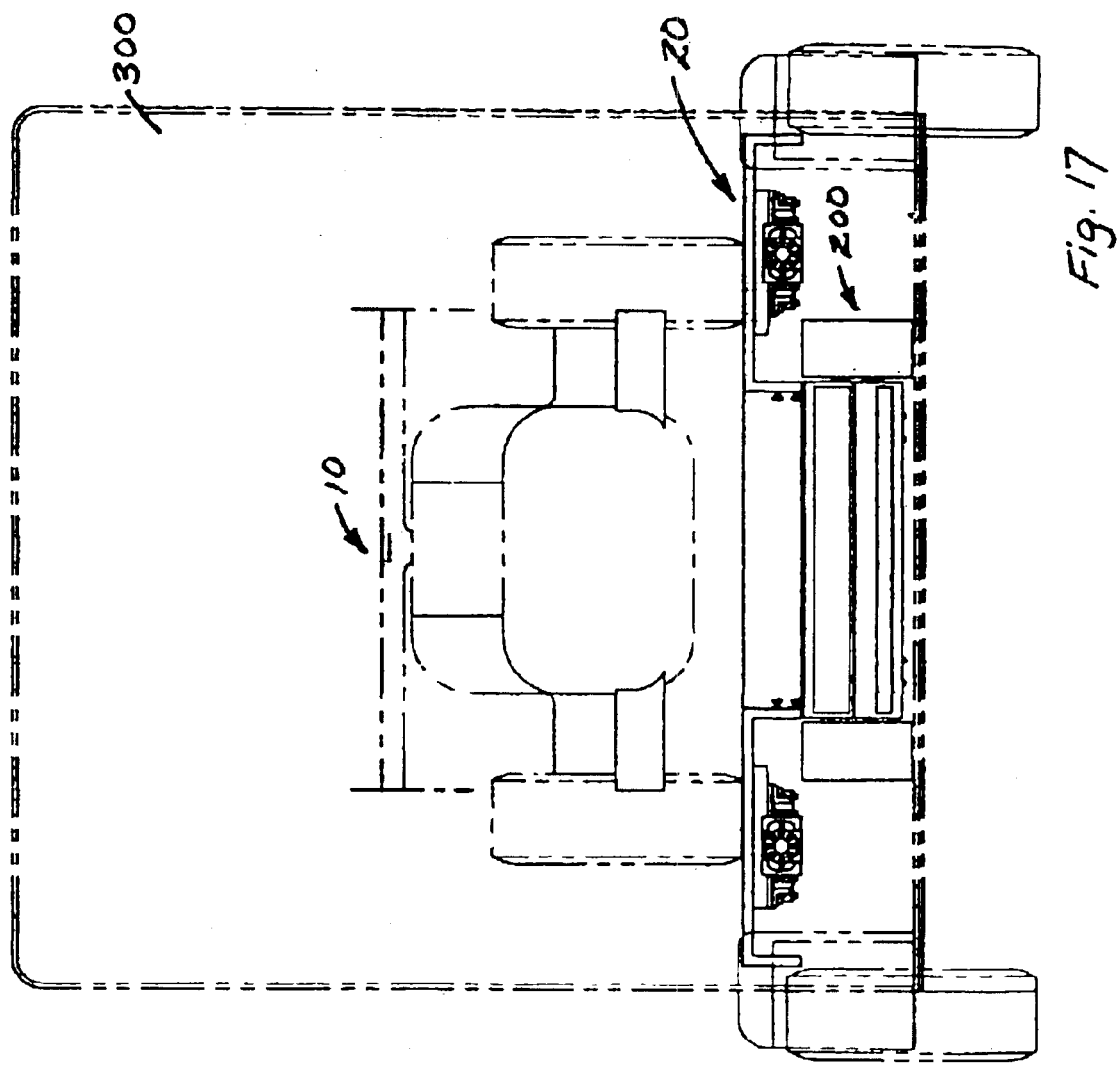

SELF-PROPELLED CRAWLER FOR LIFTING, SERVICING, AND MOVING AUTOMOBILES

RELATED APPLICATIONS

This application is a division of application Ser. No. 09/727,258 filed Nov. 30, 2000, now U.S. Pat. No. 6,612,152, titled Lifting, Servicing, and Diagnosing Automobiles, which application was a continuation-in-part of application Ser. No. 09/563,445 filed May 1, 2000, now U.S. Pat. No. 6,564,621, titled Method of Transporting, Handling, and Servicing a Racing Car, which application was copending with provisional patent application Ser. No. 60/132,139, filed May 1, 1999.

TECHNICAL FIELD

This invention pertains to the field of vehicle lifts for servicing an automobile and/or for diagnosing and tuning the chassis of an automobile. The invention also pertains to the field of transporting automobiles in carrier vehicles, loading and unloading automobiles into and from carrier vehicles, and otherwise handling the automobiles. Within those fields, the invention is particularly concerned with transporting racing cars and preparing them for racing, but has application to other vehicles and situations as well, for example transporting antique and classic cars and handling and servicing them at their destination.

BACKGROUND ART

Automobile racing is an extremely popular sport and is becoming more so. In 1998 NASCAR alone had 17 of the 20 best-attended sports events in America, each with an attendance of over 100,000 spectators. Cable television coverage of these events has greatly enlarged the audience, which is continuing to expand by millions of viewers each year. Other types of automobile racing, for example, Grand Prix road racing, drag racing, and endurance racing, are also popular throughout the world. The U.S. retail market for products made specifically for racing has been estimated at $1.5 billion annually. Equally impressive is the number of actual participants in auto racing. It was recently estimated that at least 385,000 people competed in an organized automobile race at least once in 1998.

Teams and individuals who participate in auto racing vary greatly in terms of equipment sophistication, financial and personnel resources, driver skills, and support crew proficiency. While the larger and better-financed competitors receive most of the publicity, a far greater number receive little or no publicity. For many of these participants, responding to the varied challenges presented by the competition provides much of the motivation. If a team or individual is unable to compete one way, they must be resourceful enough to devise other ways to compete, while staying within their particular limitations as well as the rules.

One of these challenges is the efficient use of time and personnel at the track. This challenge is particularly demanding during a racing event or in on-site preparation for a racing event. It is also a factor in preparation and development of the automobile and driver in order to optimize their respective performances for future racing events, since "track time" is usually limited and costly. As best stated by Carroll Smith, "Nothing is ever in such short supply at a race track as time. . . . There is never enough time. . . . Time lost during practice or qualifying is lost forever and time wasted during a day of testing is expensive and frustrating. Especially at one of the $1,000 per day tracks". (Tune to Win, 1978, page 161. Mr. Smith also authored Engineer to Win in 1984. Both books are incorporated herein by reference.)

Competing for track time are numerous procedures which require accessing and working on or inspecting the undercarriage of the racing car, often repeatedly and with unavoidable interruptions for test driving on the track. These procedures generally fall into three categories which are not mutually exclusive: chassis tuning, safety, and inspection.

Chassis tuning is essential, if the racing car is to even approach its maximum performance capabilities. While the car with the best chassis tuning may not always win the race, chassis tuning often determines the winner, will always determine the winner when other factors are equal, and almost always determine a loser if ignored. Examples of chassis tuning procedures are: diagnosing and correcting chassis binding; disconnecting linkages for front or rear anti-sway bars and exchanging an anti-sway bar (i.e., anti-roll bar or stabilizer bar) for one of a different torsion rate; determining that the rear end of the car is square to the chassis or at a desired offset (i.e., "stringing the car"), changing one or more springs, struts, or shock absorbers to ones with more desirable mechanical properties; setting the front and/or rear ride height; adjusting the front and/or rear camber to the desired degree setting; adjusting the front for camber gain and cross percentages of caster; adjusting the front and/or rear for toe-out or toe-in; adjusting for optimum bump steer; adjusting corner weights (e.g. by adjusting jack screws or wedges); adjusting for optimum Ackerman steering, if the car is so equipped; measuring and optimizing the scrub radius of tires; adjusting control devices for rear axle performance (e.g., panhard bar or Watts link); adjusting rear torque arms; adjusting other devices relative to rear axle performance (e.g., to optimize anti-squat, anti-lift, and anti-dive characteristics, rear-steering characteristics, rear camber and rear toe-in); determining optimum weight distributions on each of the car's wheels (i.e., "scaling the car"). Chassis tuning frequently uses known alignment tools, for example, turn plates, caster/camber gages, toe-in devices, and devices for measuring linear distance. Chassis tuning is a process of balancing many interrelated variables to provide optimum handling characteristics and thus ultimate racing performance.

Safety procedures include the following: inspecting fasteners and tightening as necessary; inspecting for oil leaks, gas line leaks, shock absorber malfunctions and correcting as necessary; inspecting brake lines for signs of chafing or failure and correcting as necessary; inspecting brake pads and rotors and servicing as necessary; inspecting the flywheel scatter-shield device; inspecting the drive shaft safety hoop; inspecting for damage or undesirable changes resulting from a track incident.

Routine maintenance procedures include the following: changing engine oil; inspecting and/or changing transmission lubricants; inspecting and/or changing final drive lubricants; checking and maintaining the integrity of the exhaust system.

Racing cars are transported to racing events and elsewhere by a variety of means. One such means is a tractor-trailer combination in which an enclosed, two-level trailer carries at least four cars. The cars are loaded and unloaded by an elevatable horizontal platform which is supported by two sets of diagonal chains at the rear of the trailer when in use and folds against the rear of the trailer when not in use. Such transporters are depicted in *Old Car Trader*, July 1998, pages Y-28 and Y-29, in the advertisements of VIP Transport, Inc. and Exotic Car Transport. We believe that these particular platforms fold about two hinges, in an arrangement similar to that shown by Erlinder U.S. Pat. No. 3,675,739 on a truck.

Also known are mobile lifts for servicing or transporting automobiles. See, for example, Grimaldo U.S. Pat. No. 3,931,895, Cray U.S. Pat. No. 4,445,665, Lapiolahti U.S. Pat. No. 4,750,856, and Wellman U.S. Pat. No. 5,810,544. An example of another, commercially available lift is depicted in Hemmings Motor News, September 1999 issue, page 8879, in an advertisement by Autolifters of America, Inc., Wichita, Kans.

Stationary lifts or grease pits are rarely, if ever, available for the use of contestants at a track. There are currently several methods of elevating racing cars at tracks so that they can be worked on and inspected. One such method utilizes a lever, for example a first class lever with a long handle at one end, a load-supporting surface at the other end, and in between a fulcrum which bears on the pavement. A second method involves four pressurized gas-actuated jacks which are mounted on the racing car itself. A third method consists of jacking up one side or end of the car at a time by one or more jacks which, though having a specialized and sophisticated design, operate much the same way as ordinary garage or vehicle-carried jacks. The first two methods are fast and are often used for raising a car several inches during a race for limited purposes, for example changing tires, but are not suitable for allowing working under the car for most purposes, because of obvious space, stability, and safety limitations. The third method can raise the car somewhat higher, more so if jackstands are used, but is slower and still cannot provide the access and stability made possible by more robust conventional lifts.

Each of these methods has the further disadvantage that raising the car takes the sprung weight of the car off the suspension, so that repairs, modifications, and adjustments which affect the handling of the car must be made under artificial, "no-load" conditions. Moreover, lowering the car back down does not necessarily, and probably will not, return handling-affecting parameters to a condition which allows a useful comparison with their "original condition" that existed just prior to the raising, repair, modifying, or adjustment. Put another way, in these prior art methods the mere acts of raising and lowering change these parameters. Sometimes crew personnel bounce the car up and down while rolling it backward and forward after it has been lowered, in an effort to achieve a comparable condition. This remedy is not reliable; for example, the wheels may not be able to assume their original position without having been driven at track speed with the weight of the driver. Alternatively, the car may be driven on the track again in an attempt to achieve the desired comparable suspension condition, but this remedy involves additional time and expense and may itself introduce some further variable; for example, the suspension may reflect the most recent track condition, vehicle speed, or driver action.

Some racing teams undoubtedly employ sophisticated lifts at their permanent facilities at home, and these lifts may have some degree of mobility. We are not, however, aware of a mobile lift which has been used at a track to (1) raise the car in the horizontal position (with the exception of the on-board jacks mentioned above), (2) raise the car sufficiently high to allow its undercarriage to be worked on and inspected by a person who is not lying on the ground, or (3) raise or lower the car without unloading its suspension. If such use of a mobile lift has taken place, we suspect that the reason it was not adopted for widespread use was that the lift failed to meet one or more requirements for use at a track. These requirements, in my opinion, include a combination of at least two of the following, in no particular order: mobility, compactness, ease and speed of operation, ability to be operated by one or two people, stability, safety, ease and speed of setup and takedown, rigidity, ability to duplicate previous conditions, reliability, versatility, durability, low cost, and ability to accept racing cars which, because of their ground-effects fairing designed to come as close as possible to the surface of the track, have minimal ground clearance.

Aside from lifts, equipment for diagnosing and tuning the chassis of a racing car exists, but apparently little descriptive literature has been made available to the public. We believe that most of such equipment is large, sophisticated, and expensive, and likely to be useful only at a few permanent facilities scattered around the world. Typically such facilities are by leased to well-heeled clients for relatively short periods of time. For obvious competitive reasons both the lessors and the lessees are inclined to maintain in strict secrecy the diagnostic and tuning technology as well as the application thereof to particular racing cars and problems. We are not aware of such diagnostic equipment that is designed for use at a track or has been used at a track.

Spencer-Smith U.S. Pat. No. 6,044,696 discloses portable apparatus for testing and evaluating the performance of racing cars under simulated conditions. The automobile, without wheels and tires, is bolted to the apparatus by its wheel hubs, which of course renders it unable to include wheels or tires in any diagnosis or evaluation. This apparatus does not appear to be suited for use at a track and the patent does not disclose such use, but the apparatus is said to be useful prior to arriving at the track on or just before race day, so as to enable race teams to focus their full attention on chassis set-up after they arrive at the track. The Spencer-Smith apparatus does not have the ability to lift the automobile or permit its undercarriage to be accessed for servicing.

SUMMARY OF THE INVENTION

The invention addresses these requirements and is intended to meet them more successfully than the prior art, by meeting more of the requirements and by meeting individual requirements in a superior manner.

An object of the invention is to provide a mobile lift system which may be used at a track or other race course for servicing a racing car in a horizontal elevated position, in which position the undercarriage of the car may be comfortably and efficiently accessed through an open platform by a person who, since he or she is not required to lie on the ground, has full use of both hands and ergonomically favorable body positioning and leverage.

Another object of the invention is that the system and the racing car may be transported by road to and from the course in a single carrier vehicle, such as a truck or trailer.

Another object of the invention is that the system may be used to load and unload the racing car into and from the carrier vehicle.

Another object of the invention is that the system be capable of elevating the racing car for service in a standalone mode, in which the platform is separated from the carrier vehicle, thereby conforming to the space limitations at most race courses.

Another object of the invention is that the system allow the racing car to be driven from the ground onto the platform and vice versa.

Another object of the invention is that the platform support the racing car by its tires, so as to permit the racing car to be worked on, measured, and tested without taking the sprung weight of the car off its suspension.

Another object of the invention is to use the system to simulate, on a racing car supported by the platform, loads the car is likely to encounter on the race course. While such loads are dynamic and transient on the race course, the system may be used to replicate them and their effects in a static condition, thereby enabling the observation, measurement, comparison, and analysis of the positions and relationships of various components of the car's suspension and steering.

The present invention is a system for handling and servicing a car that has been transported by road to a destination away from a permanent servicing facility at home. Exemplary such destinations include tracks or other race courses and shows and similar events for the transported car. The inventive system employs an open platform for supporting the car by its tires in a horizontal position. The platform supports the car in a carrier vehicle, such as a truck or trailer, when the carrier vehicle is transporting the car to the course. This eliminates the need for an additional carrier vehicle, an additional driver, and the attendant expenses. The platform and a separate tracked or wheeled crawler are used to unload the car from the carrier vehicle onto the ground and to load the car from the ground into the carrier vehicle. In addition, the platform is used at the course or other destination to elevate the car so that its undercarriage is accessible through an opening in the platform and thus may be worked on or inspected to prepare or improve the car for racing or otherwise service the car. These uses are equally well suited to vehicles other than racing cars, for example antique and classic cars being transported to shows, exhibitions, rallies, and the like.

A portion of the system according to the present invention is a lifting platform which has utility at a track irrespective of whether it is used for transporting the racing car. Such utility includes the chassis tuning, safety, and servicing procedures discussed thus far, which have corresponded to procedures which have been performed using a conventional lift to elevate a car. Beyond that, however, the inventive platform enables new procedures to be performed at a track as well as elsewhere. We call these new procedures "advanced chassis tuning" or, more specifically, "chassis tuning with constantly loaded suspension". Essentially these procedures are based on the concept of substituting the elevated platform for a floor, so that chassis tuning procedures can be performed simultaneously with measuring the effects caused by the procedures. For example, weighing simultaneously the four wheels of a racing vehicle is a customary way to measure these effects. Kroll et al. U.S. Pat. No. 5,232,064 discloses portable scales for weighing wheels of racing cars, and it is known that scales of this type may be arranged in a spaced relationship in a fixture which lies on the ground. Such scales may be placed in the deck of the present invention, so that the chassis may be tuned while the car is being weighed. Individually operable legs according to the invention are intended to provide the leveling control necessary for such advanced chassis tuning. Another technique which can be used in advanced chassis tuning on the platform according to the invention is manipulating the racing car to simulate, in a static situation, the positions and loadings the car has experienced or is likely to experience on the track. This is effected by providing input forces to the chassis by a rigid link connecting the undercarriage of the car to the platform. By adjusting and accurately controlling these input forces, various, dynamic loads the car will encounter on the track can be simulated.

BRIEF DESCRIPTION OF THE DRAWINGS

FIG. 4 is a section of FIG. 3 taken at 4—4.

FIG. 8 is an isometric view of a tracked crawler.

FIG. 15 is a view similar to FIG. 14, but with the piggybacked crawler and platform entering the carrier vehicle.

FIG. 16 is a view similar to FIG. 15, but with the piggybacked crawler and platform in a transport position in the carrier vehicle.

FIG. 17 is a front view of the crawler, platform, and car shown in FIG. 16.

Figure 1:
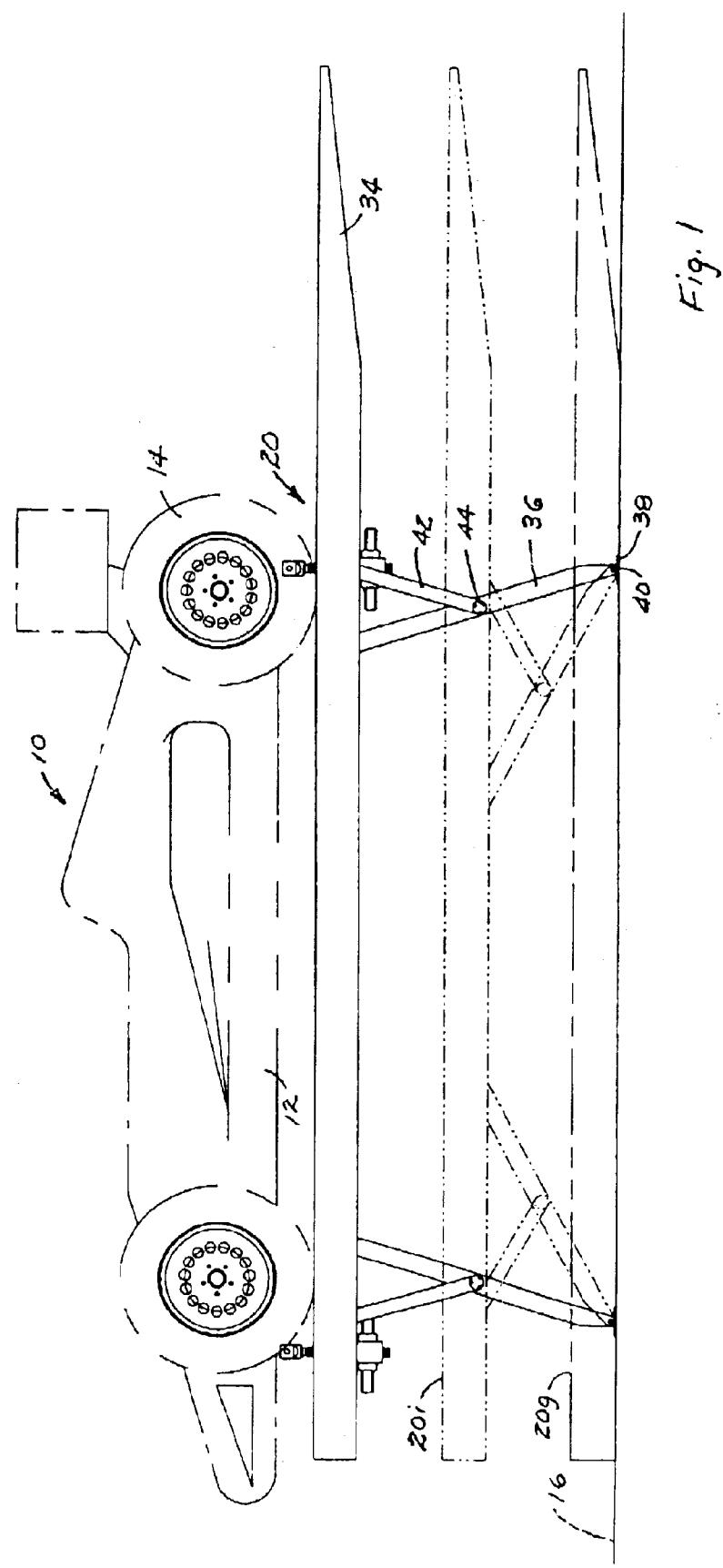
FIG. 1 is a left side view of a platform in a fully elevated position.

The drawings are approximately to scale. The platform actually has a length of 192 inches and a width of 80 inches.

DESCRIPTION OF THE PREFERRED EMBODIMENT

The following terms will be used throughout this application in accordance with these definitions, unless a different interpretation is required by the context.

The terms "automobile" and "car" mean an automobile, truck, or other vehicle which may be transported by road on or in a truck or trailer.

The term "bed", as applied to a truck or trailer, refers to a surface for supporting a car or other load being transported. A vehicle may have more than one bed.

The term "chassis" means the suspension, steering, alignment, and wheel (including the tire and rim) systems. This definition is consistent with the traditional and formal meaning of "chassis", but it should be noted that usage of this term in the art is somewhat imprecise and may be different in some prior art patens and other literature.

The term "chassis tuning" means observing, measuring, testing, and/or analyzing the chassis and then effecting any desired adjustment, correction, or servicing thereof.

The term "force-multiplying mechanism" means a hydraulic or mechanical device which employs a mechanical advantage to produce a multiplied pushing or pulling force, for example a hydraulic lift mechanism or a jackscrew.

The term "frame", as applied to a car which does not have a frame distinct from its body, means the structural component of the body of the car which is equivalent to a frame.

The terms "front" and "rear" will be used with reference to the carrier vehicle. That is, the "front" of the platform or car will be closest to the steering wheel of the carrier vehicle when the platform or car is being transported, loaded, or unloaded.

The term "ground" means any substantially flat, solid base, including earth, pavement, floor, or a surface thereon.

The terms "race" and "racing" refer to a race involving competition, either directly (i.e., head-to-head) or by comparison of recorded elapsed times, between cars with drivers.

The term "race car" and "racing car" refer to a car designed, adapted, or otherwise intended for use in racing.

The term "roll" and cognate terms, as applied to moving a car on and off a platform, refer to driving, pushing, pulling, or winching the car.

The terms "track" and "course" refer to any closed circuit or open circuit automobile race course, including circular tracks, oval tracks, figure eight tracks, road racing courses, drag strips, and endurance courses used by an automobile and driver either for racing or for development or preparation for racing.

The term "work on" and similar terms including "work" with reference to something done to a vehicle include modification, repair, adjustment, tuning, measurement, and routine service such as changing oil and lubricating. The term "service" and cognate terms mean working on or inspecting, including non-routine as well as routine maintenance.

The term "recording", as used herein with reference to digital data, includes converting, to digital form, data which was initially recorded as analog data, as well as initially recording data in digital form.

Figure 2:
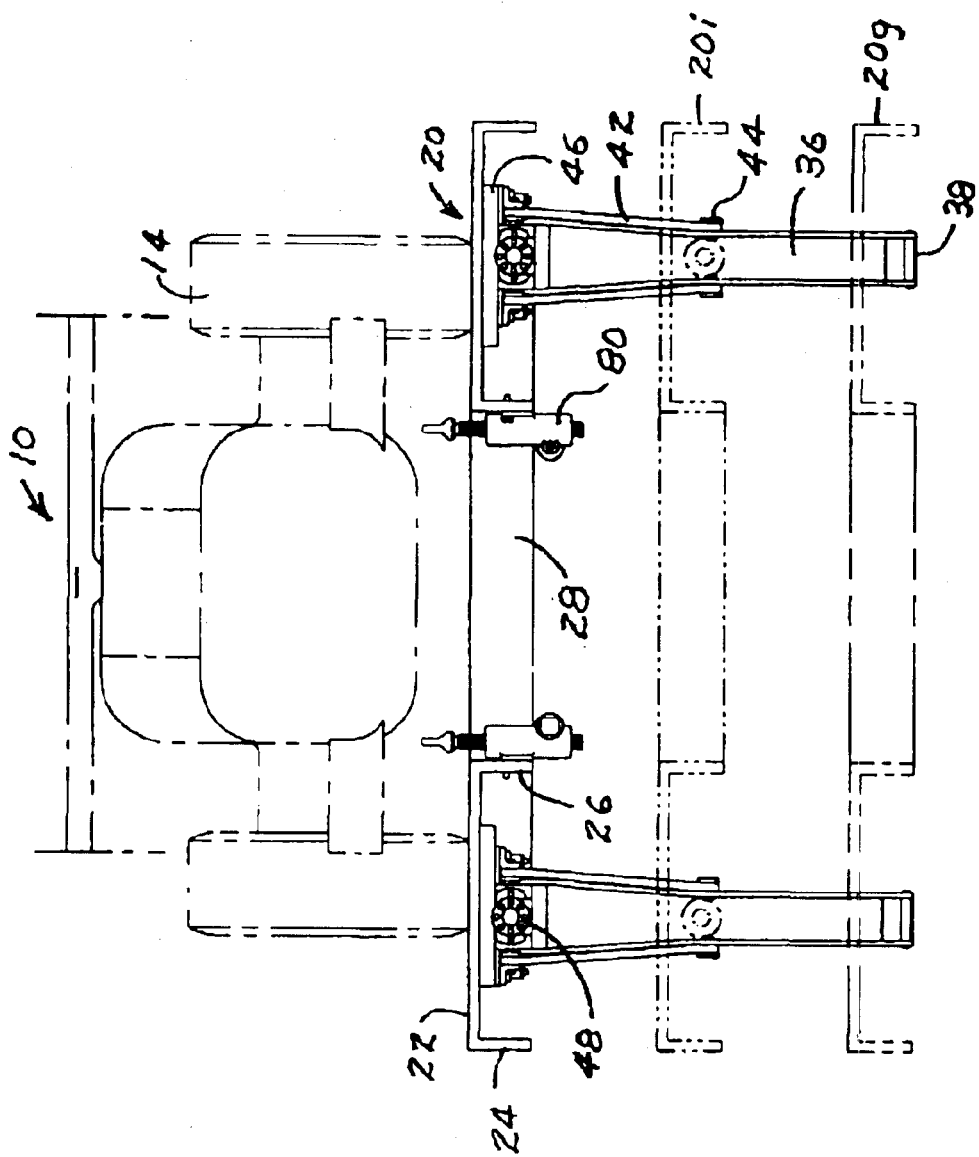
FIG. 2 is a front view of the platform shown in FIG. 1.
Figure 3:
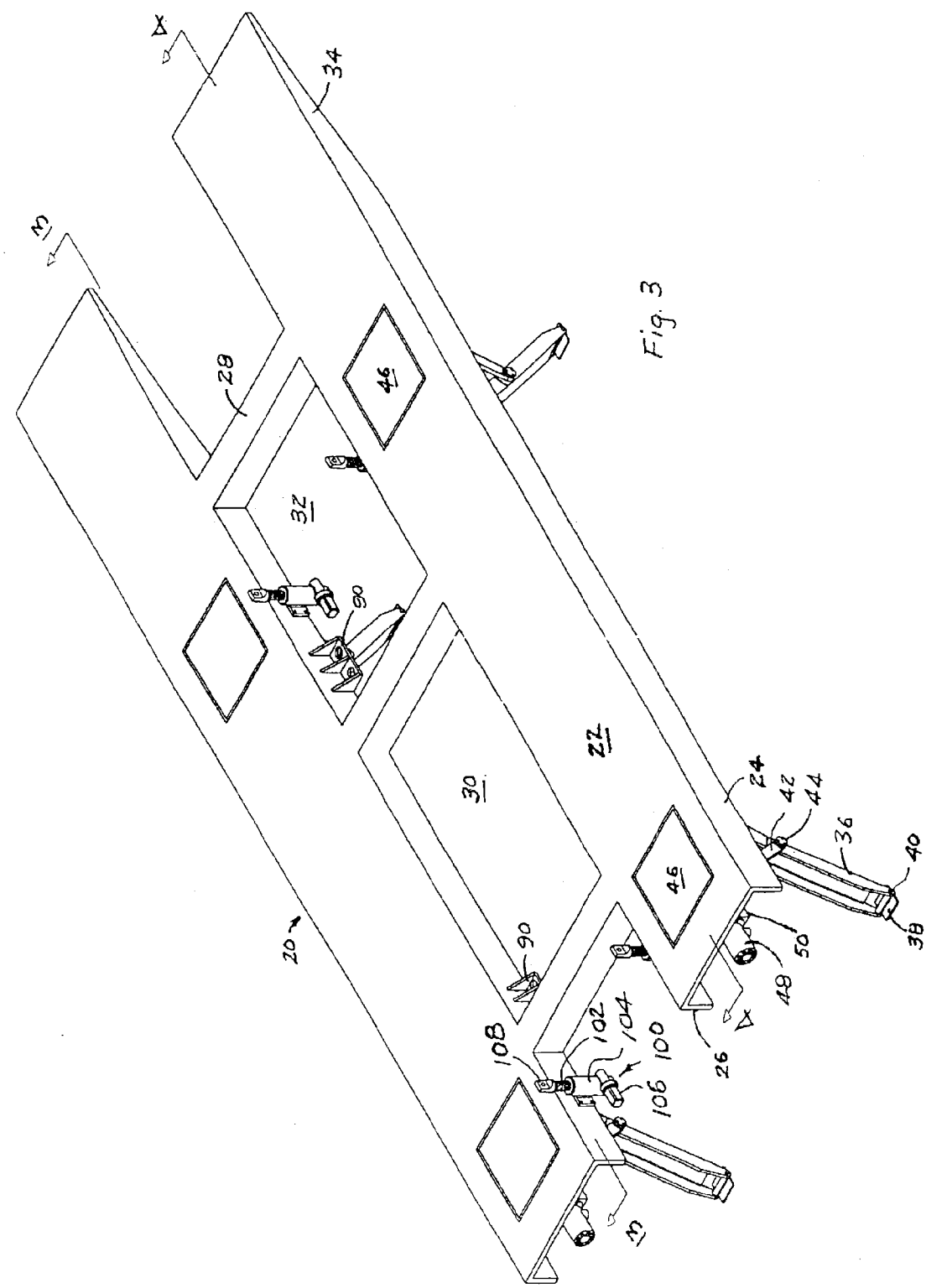
FIG. 3 is an isometric view of the platform shown in FIG. 1, in a partially elevated position.

As shown in FIGS. 1–3, racing car 10 having body or frame 12 is supported by its tires 14 on fully elevated platform 20 standing on the ground 16. A substantially rigid structure is provided by deck 22 welded to transverse members 28, with two interior access openings, front access opening 30 and rear access opening 32. Deck plates 22 have a flat, non-skid, top surface, an outer side rail 24 and an inner side rail 26, so that each deck plate has a downwardly facing C-shaped cross-section. Each deck plate 22 has a rear tapered portion 34. Transverse members 28 have a rectangular cross-section. Platform 20 is supported and spaced from the ground 16 by four extendible legs 36, each of which is a part of a leg assembly including foot 38, foot pin 40, stabilizer 42, and knee pivot bushing 44. Four scales 46 are mounted in deck plates 22.

Figure 5A:
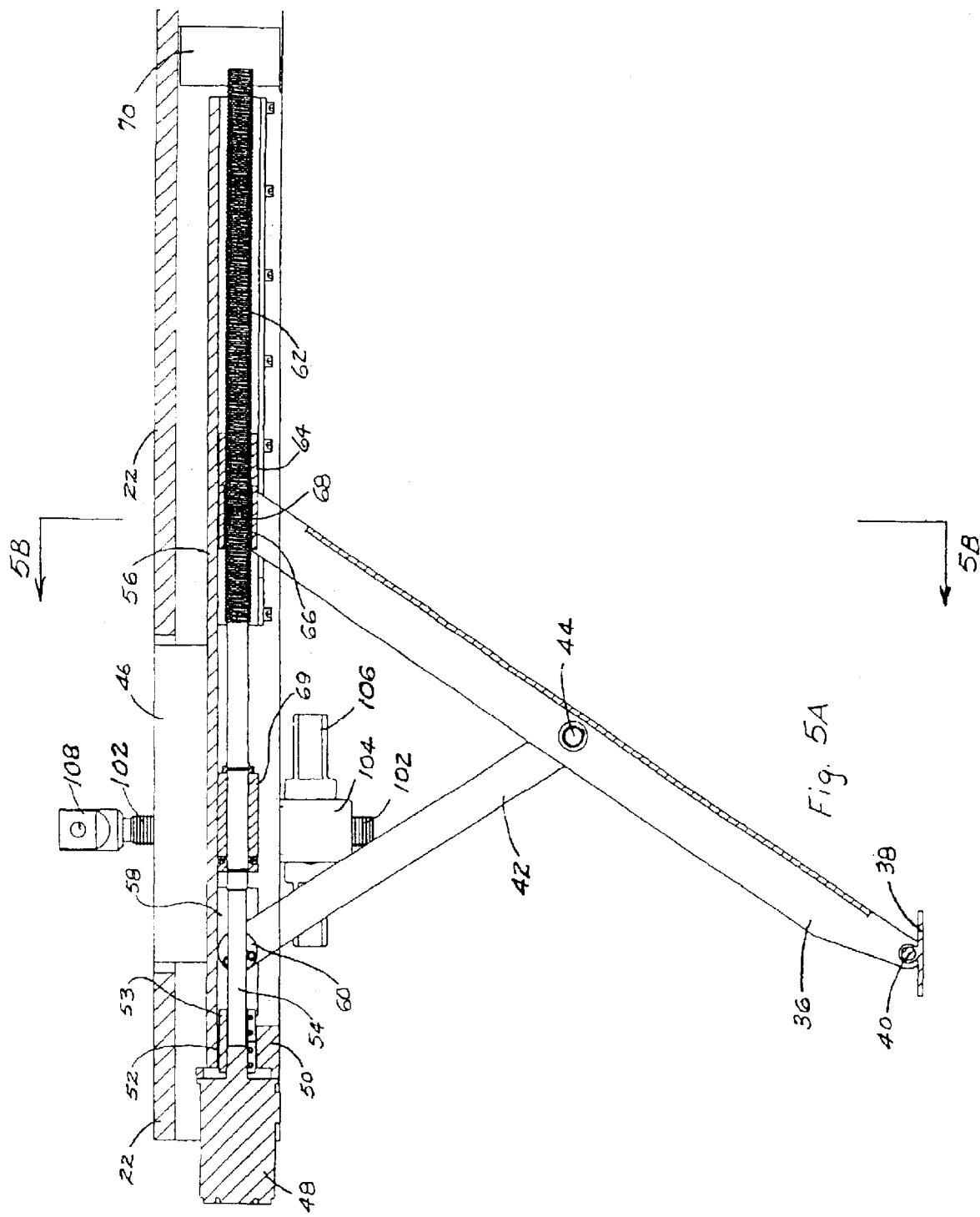
FIG. 5A is an enlarged view of the left hand portion of FIG. 4.
Figure 5B:
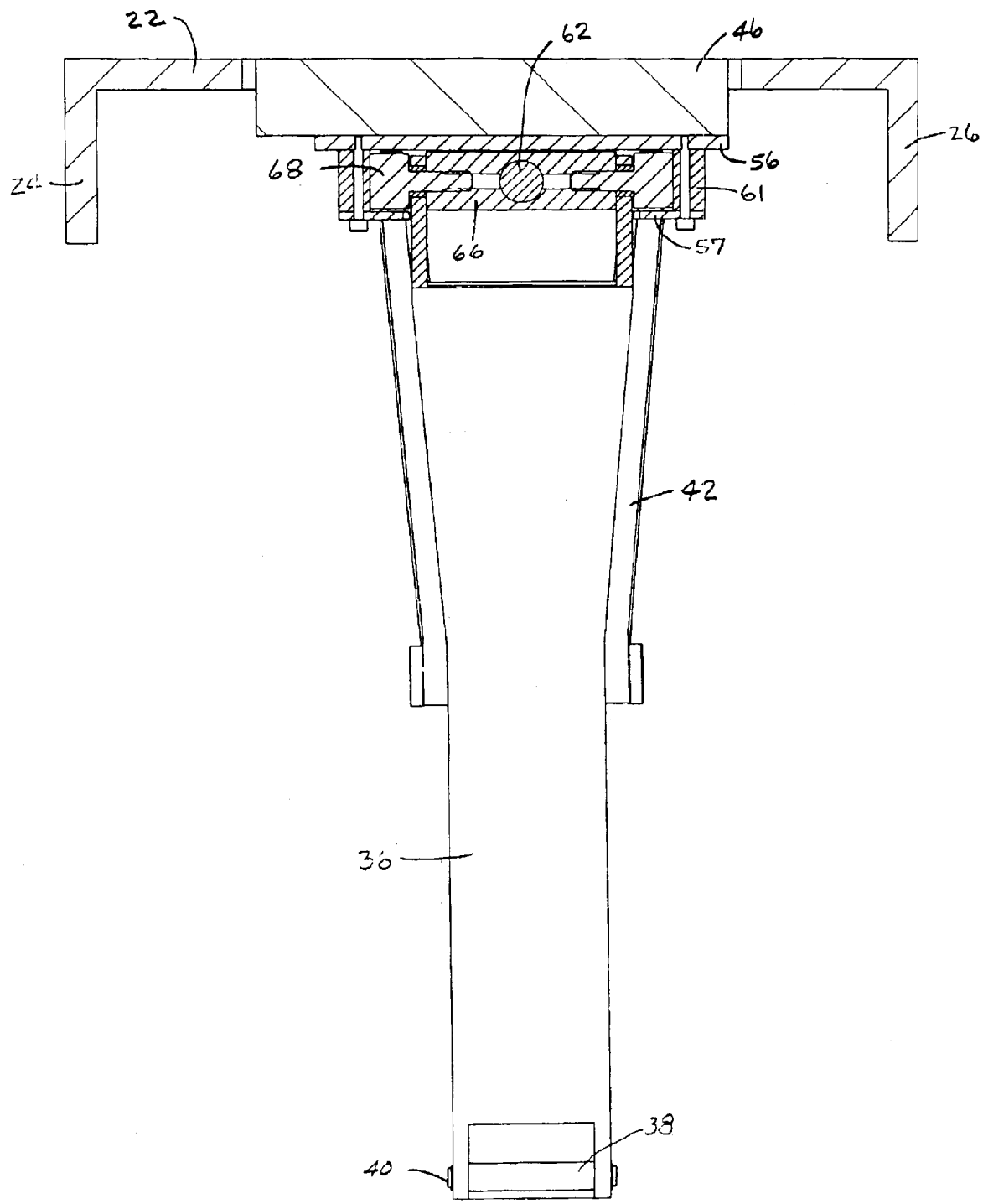
FIG. 5B is a section of FIG. 5A taken at 5B—5B.

As shown in FIGS. 3–5, each leg 36 is extended and retracted by leg assembly motor 48 supported by motor mount 50. Electric motor 50 is powered by batteries 70 (shown only in FIGS. 4 and 5), or alternatively the motor may be hydraulic and powered by an electrically powered pump (not shown). Motor mount 50 is supported by base plate 56, which is secured either to the inner and outer side rails of deck plate 22 or to the underside of deck plate 22 (see FIG. 5). The driveshaft of motor 48 is connected by coupling 52 and reducer bushing 53 to Acme shaft 54, which is supported and held in position by thrust block 69 attached to base plate 56. At its right hand end, shaft 54 has external threads 62, which pass through unthreaded slide block 66 and engage the internal threads of Acme nut 64.

At the upper end of leg 36 are slide block 66 and studded cam follower 68. Cam follower 68 bears against, and is in rotating contact with, base plate 56; is guided longitudinally by riser 61; and is protected by cover plate 57. Cover plate 57 also keeps cam follower 68, slide block 66, and leg 36 from falling away from platform 20 in the event that foot 38 leaves the ground. Slide block 66 is restrained by Acme nut 64 from longitudinal movement away from motor 48. The upper end of stabilizer 42 is rotatably attached to stabilizer pivot 60, which is bolted to stabilizer support 58.

Legs 36 may be extended or retracted, and platform 20 elevated or lowered, by selectively operating motor 48 in the clockwise or counterclockwise direction. Rotation of shaft 54 in one direction drives Acme nut 64 away from motor 48, with the weight of the platform causing slide block 66 and the upper end of leg 36 to continue to abut Acme nut 48. As this occurs, foot 38 remains planted on the ground, leg 36 rotates about foot pin 40 to a more horizontal position, and platform 20 is lowered. When motor 48 is operated in the opposite direction, the process is reversed and platform 20 is elevated. In this manner legs 36 may be extended and retracted to move platform 20, with or without the car on it, to the fully elevated horizontal position shown in FIGS. 1 and 2, to the fully lowered, horizontal, ground position shown by chain lines 20g, and to various positions between these two positions, for example the intermediate horizontal position shown by chain lines 20i. Since each leg assembly is driven by its own individual motor, legs 36 may be extended or retracted individually. This permits accurate leveling of platform 20. In addition, the front legs and the rear legs may be selectively operated so that the rear, tapered portion 34 of platform 20 rests flat on the ground, while the front end of platform 20 is elevated. This position (not shown) allows a car with limited ground clearance between the front and rear wheels to be driven onto the inclined platform without scraping. The use of a threaded shaft and nut as the force-multiplying mechanism enhances the safety and simplicity of the system, since the inherent friction keeps the platform from falling to the ground due to non-catastrophic system failures and avoids the need for engaging a separate locking or safety device when the platform is in a stopped position. Such devices are essential in hydraulic and cable systems. As shown in FIGS. 1 and 2, when platform 20 is in ground position 20g, the leg assemblies are retracted completely into deck plates 22. This enables the top surface of platform 20 to get very close to the ground, while keeping the leg assemblies completely under platform 20 as a design parameter.

Figure 6:
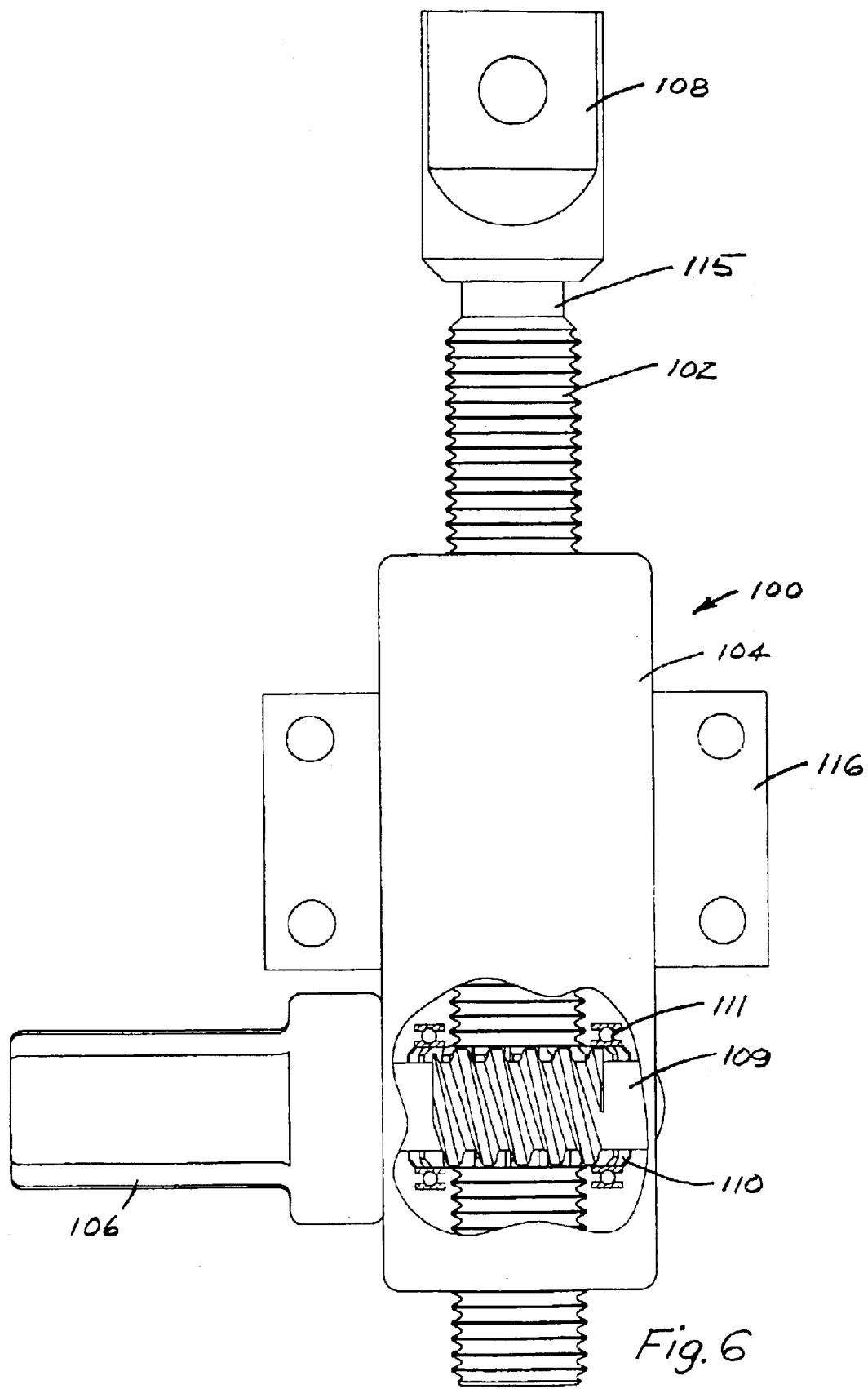
FIG. 6 is a side view of an actuator, with a portion of the housing of the actuator body broken away.

As shown in FIG. 6, actuator 100 comprises body 104, shaft 102, strain gauge 115, coupling attachment 108, and mounting bracket 116. Shaft 102 passes through internal worm gear 110, which is rotatably mounted on bearings 111. Actuator motor 106 rotates externally threaded shaft 109, driving an internal worm gear 110 which translates the actuator shaft 102 linearly in a vertical direction. Shaft 102 does not rotate. Actuator coupling 108 provides an attachment point to the car body. Mounting bracket 116 is attached to the inner side rail 26 or actuator carriers (not shown).

Figure 7A:
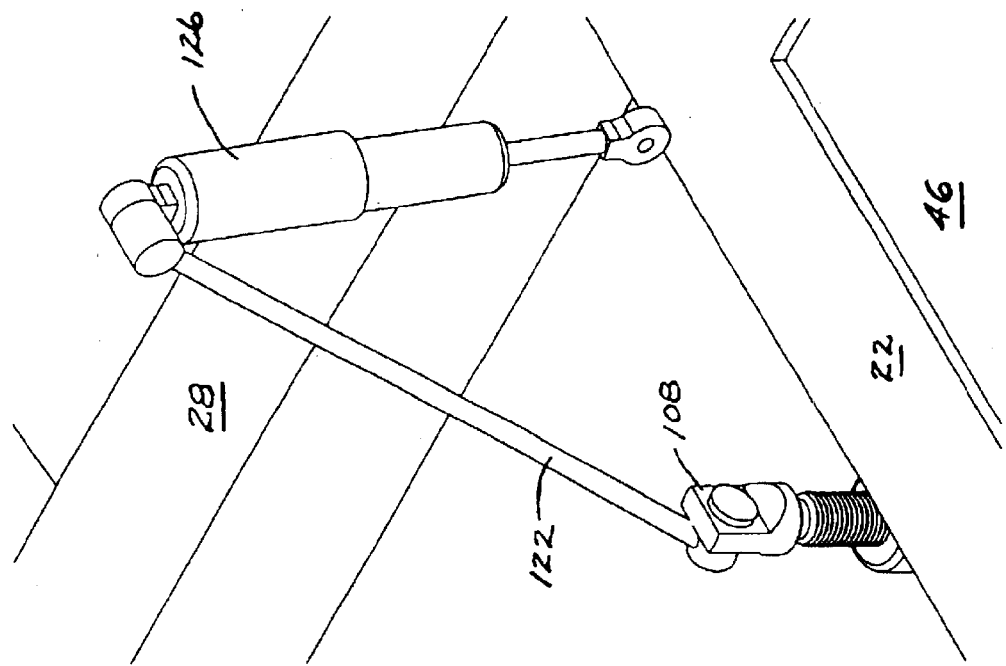
FIG. 7A is an isometric view of an actuator connected to the frame of a car at the upper left rear shock absorber mount.
Figure 7B:
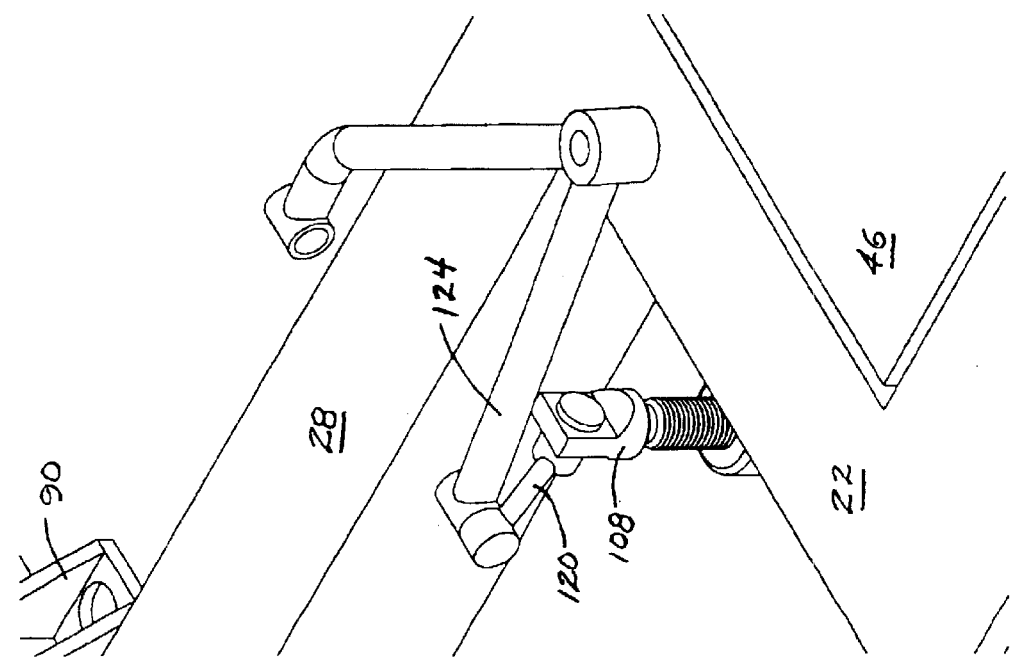
FIG. 7B is an isometric view of an actuator connected to the frame of a car at the left front lower control arm.

As shown in FIGS. 7A and 7B, the actuator coupling 108 is connected to a point on the car body near a suspension mount. The actuator coupling 108 may be attached directly to the car body or frame or indirectly thereto through a rigid link. As shown in FIG. 7A, front link 120 for the left front of the car is attached to the car's left lower control arm 124. As shown in FIG. 7B, rear link 122 for the left rear of the car is attached to the top mount of the car's left rear shock absorber 126. The actuator may then be energized to load the suspension by pulling or pushing to duplicate a desired position of the chassis, for example a measured condition found on the race course. Strain gauges 115 measure the pulling or pushing forces. Scales 46 measure the resulting wheel weights.

Mounting brackets 116 or the actuator carriers attaching each actuator 100 to an inner side rail 26 may be removed and reattached to a different location on inner side rail 26, so that each actuator 100 can be positioned directly under the point on the car frame where the force is being applied. In addition, actuator 100 and the bracket and/or carrier may be pivotally connected so that when the bracket or carrier is bolted to inner side rail 26, actuator 100 may be pivoted 90 degrees about a horizontal axis transverse to the longitudinal axis of platform 20 and then locked into one of two positions—the operating position shown in the drawings and a horizontal position parallel to that longitudinal axis, In the latter position, actuator 100 is out of the way, and permits platform 20 to be fully lowered to the ground.

As shown in FIG. 8, tracked crawler 200 has frame 202 comprising side plate 204, cross-member 206, and floor 207. Tracks 214 surround ground wheels 208, drive wheels 210, and idler wheels 212. Drive wheels 210 are driven by electric drive motor 216, which is powered by batteries 218 connected to control box 222. Also connected to control box 222, by cable 221, is remote control 220, which has independent controls for driving each track separately and thus serves as a steering mechanism. Positioning pins 224 project upwardly from frame 202.

Figure 9:
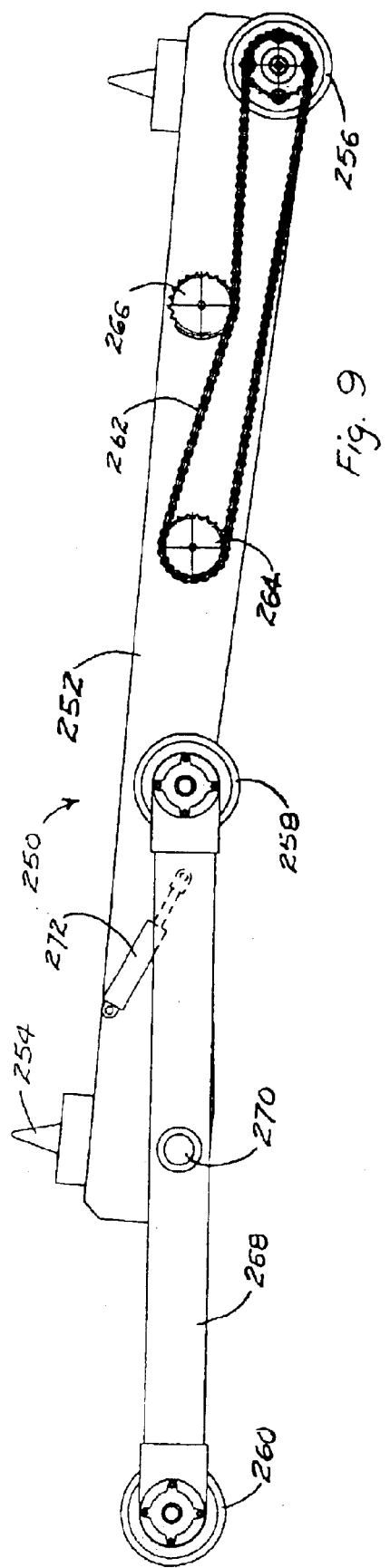
FIG. 9 is a left side view of a variation of the crawler shown in FIG. 8, which variation does not have tracks.
Figure 10:
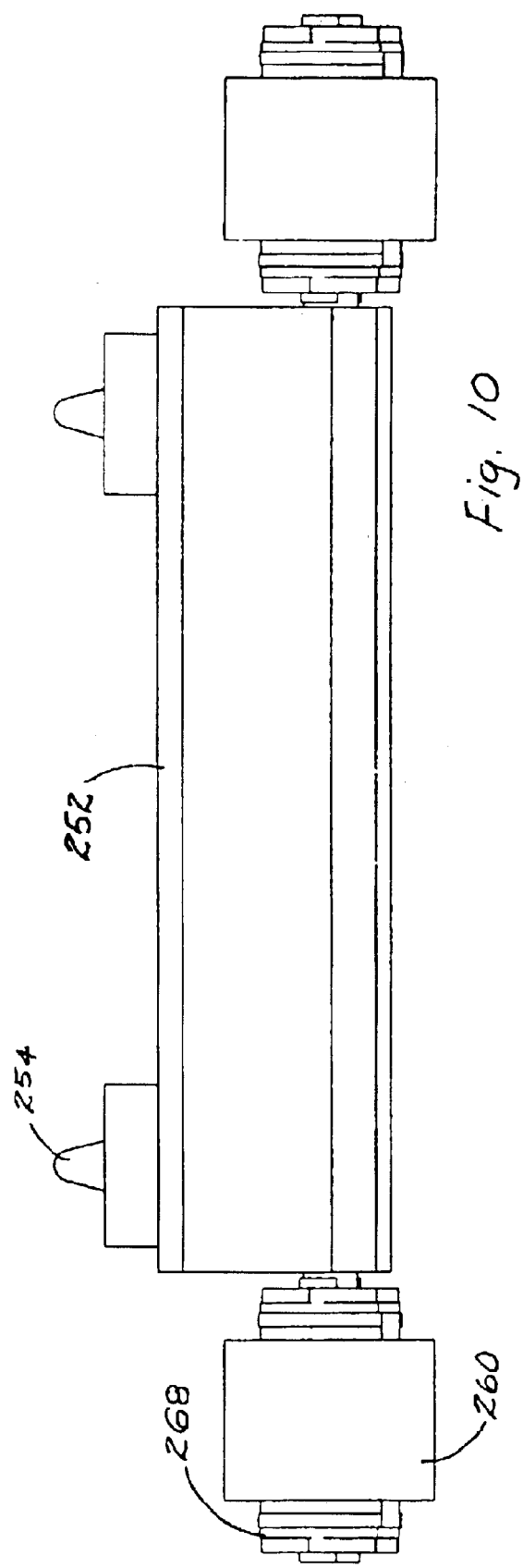
FIG. 10 is a front view of the crawler shown in FIG. 9, with its ground wheels vertically aligned.

As shown in FIGS. 9 and 10, non-tracked crawler 250 has frame 252 and upwardly projecting positioning pins 254. Instead of tracks, however, crawler 250 has six ground wheels which are in direct contact with the ground. These are rear wheels 256, center wheels 258, and front wheels 260. Rear wheels 256 are driven by roller chains 262, which in turn are driven by drive sprockets 264. Tension wheels 266 tension chains 262. Front wheels 260 and center wheels 258 are mounted on bogies or equalizer arms 268, which are pivotally connected to frame 222 by axle 270. Center wheels 258 and front wheels 260 may be driven by tensioned roller chains in a manner (not shown) similar to rear wheels 256, except that their drive sprockets are coaxial with axle 270. Hydraulic lift cylinder 272 is connected to frame 252 at its top end and at its bottom end is attached to bogie 268 near center wheel 258. Like tracked crawler 200, non-tracked crawler 250 is powered by batteries connected by a control box to motors which drive the drive sprockets (not shown), and the control box is connected to a remote control which is capable of steering crawler 250 by enabling the operator to apply power selectively to the ground wheels on either side or to the ground wheels on both sides simultaneously (not shown). To facilitate turning non-tracked crawler 250, weight can be concentrated on center ground wheels 258 by applying fluid pressure to lift cylinder 272, thereby driving center wheels downward and lessening the weight on front wheels 260.

Figure 11:
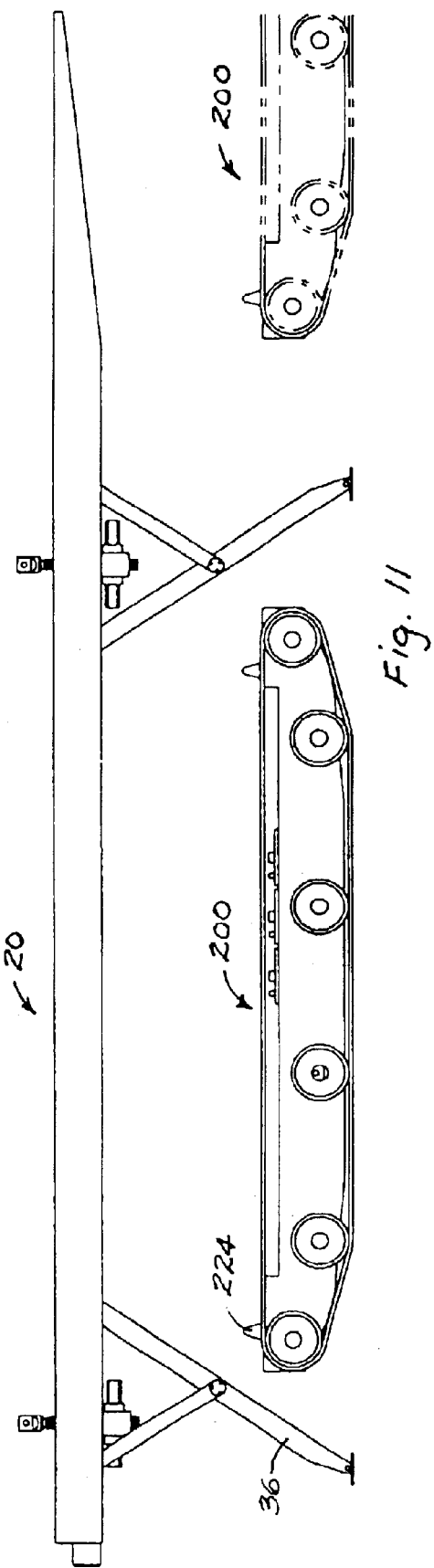
FIG. 11 is a left side view of a platform in a partially elevated position and a tracked crawler centered beneath the platform.
Figure 12:
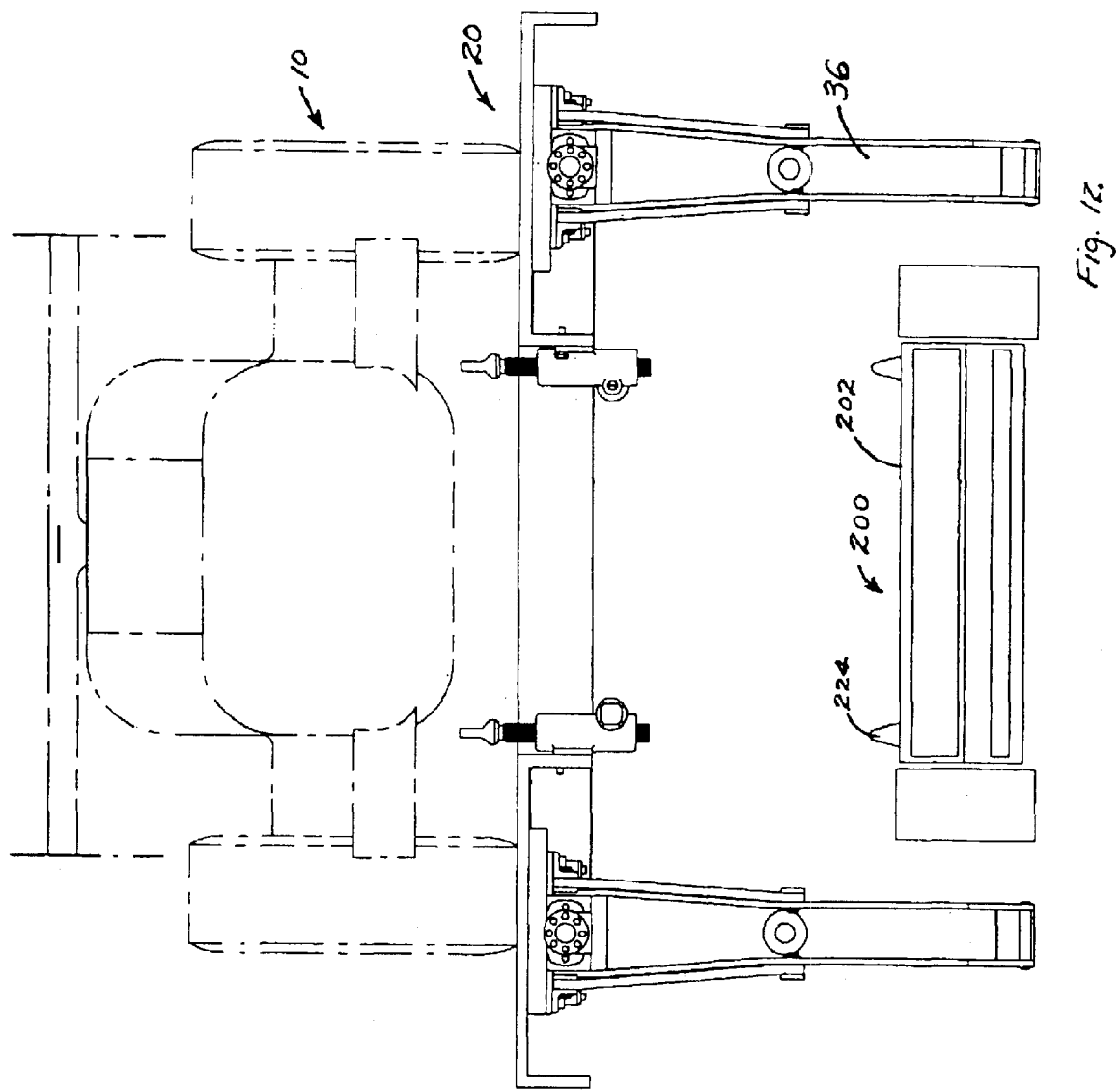
FIG. 12 is a front view of the crawler and platform shown in FIG. 11.
Figure 13:
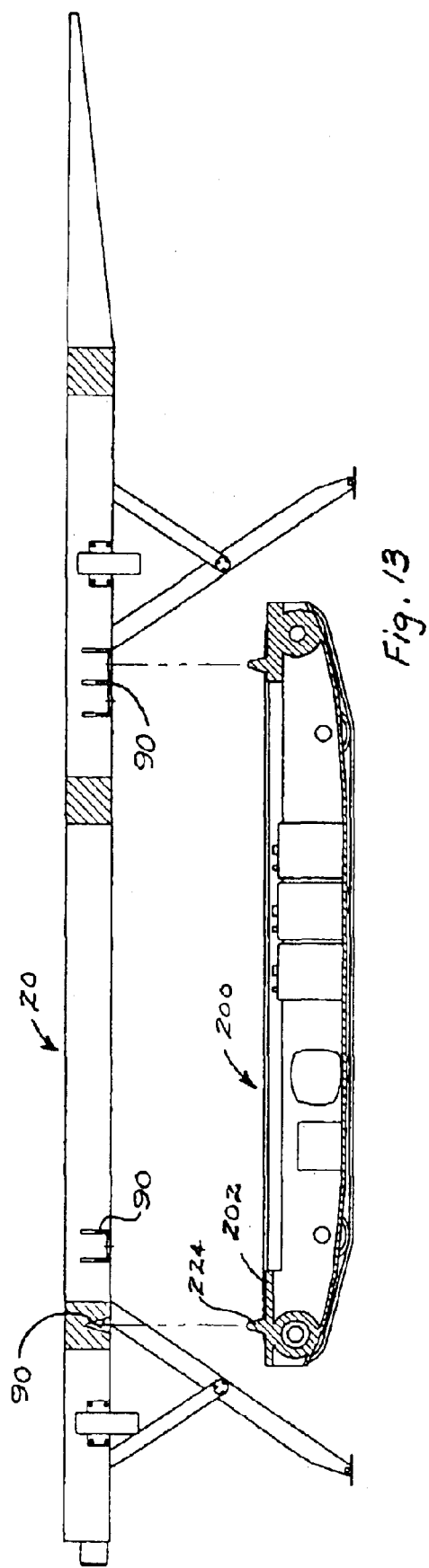
FIG. 13 is section of FIG. 3 taken at 13—13 and a section of FIG. 8 taken at 13—13.
Figure 14:
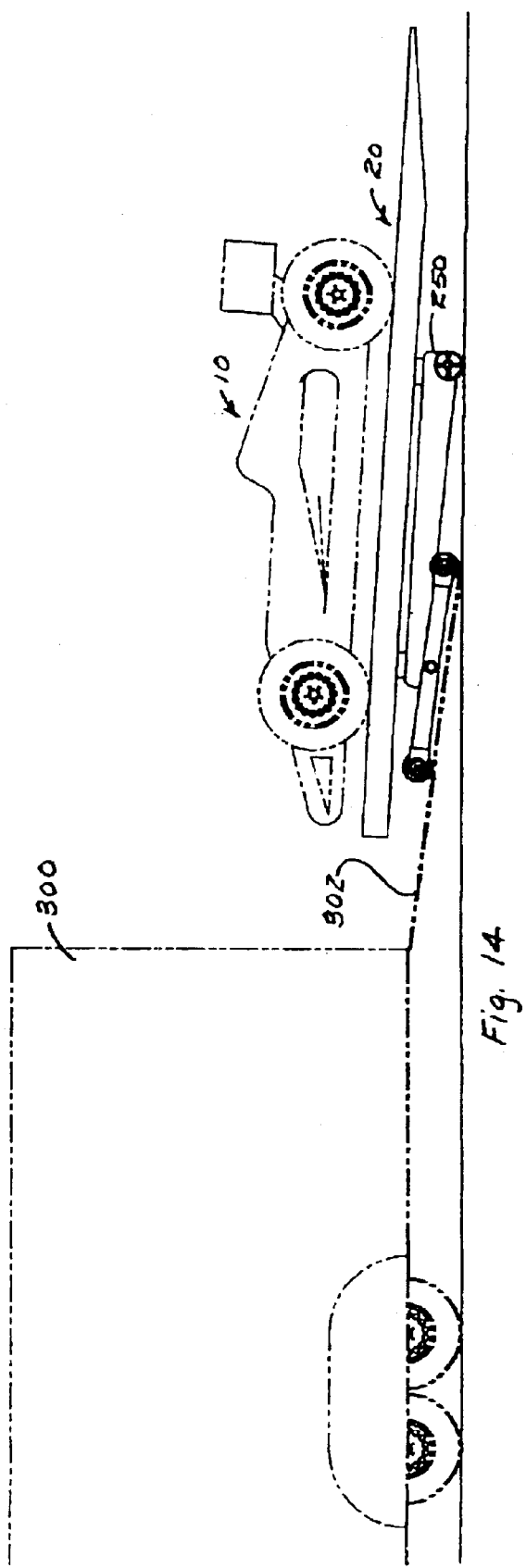
FIG. 14 is a left side view of a piggybacked non-tracked crawler and platform carrying a car and being driven up the ramp of a carrier vehicle.

FIGS. 11–13 show how platform 20 piggybacks on tracked crawler 200. With platform 20 elevated to an intermediate position, crawler 200 is driven from the position shown by chain lines, between the rear legs of platform 20, to a centered position between the platform's front and rear legs 36, so that positioning pins 224 are beneath and aligned with four positioning pin sockets 90. Then legs 36 are retracted, so that positioning pins 224 engage positioning pin sockets 90 and the weight of the platform (and the car, if the platform is carrying a car) is supported by crawler frame 202. Then legs 36 are fully retracted into the deck plates. In this piggybacked mode, crawler 200 may be driven on the ground and steered, with the platform and car carried on it.

FIGS. 14–17 show how platform 20 and car 10 piggybacked on non-tracked crawler 250 are driven into a carrier vehicle 300, which may be a truck or a trailer, via ramp 302, for transport to a track or other destination.

It is important that the crawler be separable from the platform. While the two could conceivably be integral, creating in effect a motorized, steerable pallet, the result would be that all the machinery for propelling and guiding this apparatus would remain with the platform while it is being used at the track for servicing and tuning cars and the like. As a matter of engineering and design, such integral machinery would have to be either under the platform or beside it, or both. If the integral machinery is beside the platform, then the widths of the platform and the car would have to be limited, since the combination cannot be any wider than the interior width of the carrier vehicle. If the integral machinery is under the platform, then the platform cannot be lowered sufficiently close to the ground to allow cars with limited ground clearance to drive onto it. By enabling the crawler to be withdrawn from beneath the platform, as described earlier, the crawler can be stored in a remote location or driven back into the carrier vehicle and left there while the platform is being used at the track. In addition, the invention allows the separation of the platform and the crawler to be effected by the platform's extendible leg systems, which the platform must have anyway for other purposes, so that no specific machinery is necessary for this purpose. The separation is "free".

Advanced chassis tuning provides the ability to measure and manipulate chassis parameters outside of the bounds of a simple measurement or a measurement after a single element of suspension geometry has been removed, replaced, or otherwise changed. Advanced chassis tuning covers a range which extends from measuring multiple chassis points, to manipulating those points in a methodical fashion, and finally to manipulating suspension points with active controlled inputs so as to duplicate, in a static testing facility, the dynamic condition of a race car during or in preparation for a racing event.

Thus, advanced chassis tuning can be separated into three stages.

Stage 1 advanced chassis tuning is based upon the concept of placing a race car on a level surface and being able to accurately measure all suspension components and setups without moving the vehicle again. This includes wheel loading, left and right toe angles for both front and rear, left and right camber angles for front and rear, left and right caster angles for both front and rear, left and right kingpin inclination for both front and rear, wheelbase, front and rear track widths, parallelism and squareness of front and rear axle assemblies, and half track widths. The distinguishing feature of Stage 1 chassis tuning is that it is based upon the principle of measuring a static car with no external inputs.

Stage 2 advanced chassis tuning consists of all of the elements of Stage 1 tuning but adds the ability to provide single to multiple inputs. This means that a step or ramp input to the steering or to a chassis member can be applied and all of the measurement capabilities of Stage 1 can be used to determine quantifiable changes to suspension geometry. For example, Ackerman effect is the effect of the left and right wheels turning unequal amounts for a given steering mechanism movement. In Stage 2 tuning, the wheels can be set to a specific turn angle and the chassis could be positioned so as to simulate the car entering a corner. All of the measurement systems can then be used to determine whether any suspension components behave unacceptably. Ideally, four links or other connections are mounted on or immediately adjacent to the suspension mounting points on the chassis. For example, the bolts that provide the pivots for the lower control arms would be ideal and would be unlikely to damage a chassis under test. The load is being applied back through the point which is supposed to support that load.

Stage 2 advanced chassis tuning involves pulling to a data point in time. Traditional loading and computer design programs tend to check only one parameter at a time. That is, they compute the camber, caster, toe-in change as the chassis is lowered or raised, or, they may do the same as steering angle is raised, or the same as dive under braking or squat under acceleration are simulated. In Stage 2 chassis tuning, however, the instantaneous data point in time is based on multiple inputs (steering, single wheel bump, and braking distortion, chassis roll, etc.), These inputs can be fed into the chassis and the disturbance to all of the above points (caster, camber, etc.) can be again measured for unusual deviations.

Stage 3 advanced chassis tuning correlates to the incorporation of the data from an onboard data acquisition system to simulate real world chassis conditions. One such system is described in Purnell et al. U.S. Pat. No. 5,173,856. This Purnell et al. patent discloses, among other things, a vehicle data recording system employing analog sensors which sense selected positions and forces during actual driving on a track, converting the analog data into digital data, and storing the digital data in memory. For example, during a test session the car driver reports that the vehicle always slides disconcertingly in a specific corner at a specific point in that corner. Stage 3 tuning allows the simulation of most chassis conditions on a test mechanism back at the pits. In effect, it gives one the ability to "freeze frame" the vehicle. By using four or more measured, stored pieces of data, a Stage 3 chassis tuning device can apply loads and conditions so as to relatively closely approximate the position and load of the suspension components when the undesirable behavior was noticed. Stage 3 allows a chassis specialist to inspect the vehicle in the stressed condition, i.e., "freeze framed" state. Visual inspections can be performed to determine if suspension components are loose or if components have deflected a significant amount under track conditions, or to detect similar readily observable problems. The measurement techniques used in Stage 1 chassis tuning can be brought into play and accurate measurements of all suspension points can be performed in the stressed condition. This information can be used by a race car engineer to determine what chassis components need to be adjusted, replaced, or redesigned.

In addition, the use of four actuators allows one to mimic true chassis behavior on the track to the extent that chassis deformation can be studied. Theoretically only three actuators are required to pull the chassis out of plane. However, the chassis will not be planar under the loads imposed on a racetrack. The fourth actuator will pull the chassis to the stressed condition as recorded by the data acquisition system. Stress and deflections of the chassis can be studied. Chassis modifications to reduce stress can be prototyped on the unit and behavior of the suspension can be altered to be compatible with increased chassis rigidity.

The actuators used in Stage 3 tuning allow simulation of tire performance. Under vertical load, the sidewall of a tire is a spring damper combination. By imposing vertical loading, the static spring rate of a tire can be determined. The vertical spring and damper rate of a tire has a significant effect under acceleration and braking in that ride height of the vehicle is affected which in turn affects roll center and chassis center of gravity. The use of rotating or sliding elements under the scales allows one to look at tire sidewall deformation and tire slip angle. As a tire grips the road in a corner, the sidewall of the tire is pulled out of concentricity with the wheel. Under high cornering load, the tire also has a "slip angle". "Slip angle" is the difference in the angle of the tire contact patch as measured from the angle of the steering input. Tires must build slip angle to generate lateral holding forces. The elements under the wheels would allow one to either lock those elements and induce lateral loading by turning the steering system or one could add some type of actuator to physically generate slip angle.

An illustrative example of Stage 3 tuning is as follows. Suppose a race driver were to complain that the race car handles unacceptably over a specific track area. The car could be placed on a Stage 3 device and the data points that define that section of track could be recalled. Suppose further that the data points when duplicated by a Stage 3 system left the car positioned and stressed such that one wheel of the car was essentially unloaded. This information cannot be obtained without Stage 3 tuning. Conventional procedures cannot apply the various simultaneous inputs to the vehicle so as to position the car to mimic the track condition. Based on measured suspension location and measured wheel weights, one skilled in race car suspension setup could vary anti-roll bars, shock absorber rates, spring rates, suspension mounting location points, etc. so as to alter the position of the car to achieve a more desirable suspension condition. The more desirable position is difficult to define since there are so many different parameters in racing and a desirable parameter on one track may not be desirable on another.

In addition, once a suspension setup is determined to be optimal, the suspension performance under load can be recorded and used to set up the same car when it returns to a specific track or to become a base point for another car in development, thereby shortening development time.

Of course, when a car is supported on an elevated platform according to the invention, it is possible to unload its suspension if desired. For example, we have found it easy to put a scissors jack on the platform and jack up a wheel to change a tire.

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

What is claimed is:

1. Self-propelled apparatus for vertically lifting and servicing cars and moving them along the ground and into and out of a carrier vehicle, which apparatus comprises a rectangular, rigid platform which when free-standing is capable of supporting a car by its tires in either an elevated, horizontal position or a lowered, horizontal, ground position, which platform comprises
    at least one access opening permitting access to the undercarriage of the car through the platform when the platform is in an elevated horizontal position,
    four extendible legs for supporting the platform at varying distances from the ground, and
    a force-multiplying mechanism for extending and retracting the legs so as to move the platform and a car supported by the platform to a fully elevated horizontal position and to a fully lowered horizontal position,
a crawler separate from the platform, which crawler comprises
    at least four wheels,
    at least one motor for driving the wheels and thereby propelling the crawler along the ground,
    a steering mechanism,
    operator controls for actuating the motor and the steering mechanism, and
    a support surface for engaging and supporting the platform in a piggyback position on the crawler,
the crawler being adapted to be propelled by the wheels to a position beneath the at-least-partially elevated platform wherein the platform straddles the crawler, so that the legs of the platform may then be retracted until the platform is in the piggyback position,
the piggybacked platform and crawler being adapted to be propelled by the wheels along the ground and into and out of a carrier vehicle, with the platform carrying the car,
the platform and crawler being shaped and dimensioned so that, in the piggybacked position with the platform supporting the car, they may be driven by an operator into a carrier vehicle having an interior length, width, and height of 636, 102, and 162 inches, respectively.

2. Apparatus according to claim 1 wherein the crawler is a tracked vehicle having, at each of its opposite sides, a tread which is in contact with the ground and encompasses two of the wheels.

3. Apparatus according to claim 1 wherein the crawler is a vehicle having six wheels and two bogies, with two wheels being mounted on each bogie.

4. In combination,
    an automobile-lifting platform comprising
        an access opening,
        a plurality of extendible legs, and
        a force-multiplying mechanism for extending and retracting the legs,
    a crawler comprising
        a plurality of wheels,
        a motor for driving the wheels,
        a steering mechanism, and
        operator controls for actuating the motor and the steering mechanism, a carrier vehicle comprising a truck or trailer, and
    an automobile,
    the crawler, the platform, and the automobile
        being transported in the carrier vehicle to a destination, with the platform being supported by the crawler and the automobile being supported by the platform,
        being removable from the carrier vehicle at the destination, and
        being separable from each other at the destination.

\* \* \* \* \*